United States Patent Office 3,536,707
Patented Oct. 27, 1970

3,536,707
**2-(2-AMINOALKANOYLAMINO)-
3-PHENYLNORBORNANES**
Shin Hayao, Elkhart, and Wallace Glenn Strycker, Goshen, Ind., assignors to Miles Laboratories, Inc., Elkhart, Ind., a corporation of Indiana
No Drawing. Filed June 22, 1967, Ser. No. 647,898
Int. Cl. C07d 87/42
U.S. Cl. 260—247.2                     9 Claims

ABSTRACT OF THE DISCLOSURE

2 - (2-aminoalkanoylamino)-3-phenylnorbornanes and pharmacologically acceptable salts thereof that are useful as analgesics. Prepared by acylating a 2-amino-3-phenylnorbornane with a haloacyl halide forming a 2-(2-haloalkanoylamino)-3-phenylnorbornane that is then aminated, or prepared by reacting 2-amino-3-phenylnorbornane with a lower alkanamide, that is then reduced to 2-lower alkylamino-3-phenylnorbornane, which is further processed according to the first stated processing steps.

---

This invention relates to a novel series of 2-substituted-3-phenylnorbornanes having desirable pharmacological properties and more particularly to a series of 2-(2-aminoalkanoylamino)-3-phenylnorbornanes that are useful as analgesics.

The new compounds may be represented by the structural formula:

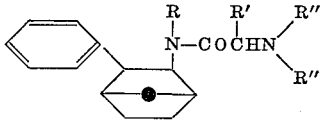

in which R is selected from the group consisting of hydrogen and lower alkyl, R' is a member selected from the group consisting of hydrogen, lower alkyl and phenyl, $NR''_2$ is a member selected from the group consisting of dimethylamino, diethylamino, morpholino, 4-phenyl-1-piperazinyl and 4-phenyl-1-piperdyl.

The novel compounds of this invention may be readily prepared and isolated as free bases or pharmaceutically acceptable acid addition salts. The free bases are only slightly soluble in water. Preferably, these compounds are prepared as water soluble, non-toxic, pharmaceutically acceptable acid addition salts. These salts may be formed with mineral acids such as halogen acids or sulphuric acid, or organic acids such as citric acid, maleic acid, oxalic acid and other similar acids.

The 2 - (2-aminoalkanoylamino)-3-phenylnorbornanes of the invention are useful as analgesics.

Medications including 2 - (2-aminoalkanoylamino)-3-phenylnorbornanes as a active ingredient may be administered orally or intraperitoneally in effective doses according to accepted pharmocological procedures.

Suitable medications may be formed by combining one or more of the active ingredients, as a free base or preferably as a pharmaceutically acceptable acid addition salt, in dosage units with commonly accepted diluents and tableting adjuncts such as cellulose powder, cornstarch, lactose, talc, stearic acid, magnesium stearate, gums and the like in accordance with accepted manufacturing practices. Medications may be also formed by combining the water-soluble salt with water, glucose solution and similar liquid carriers. These medications may be either in solid or liquid state and may be compounded as tablets, powders, capsules, suspensions and similar dosage forms.

2-(2 - aminoalkanoylamino)-3-phenylnorbornanes may be prapared by acylating 2-amino-3-phenylnorbornane with a haloacyl halide in which the halogen is preferably chlorine or bromine. This reaction is advantageously carried out in an inert solvent at a temperature of about 0° C. Suitable inert solvents include, for example, benzene, ether, toluene or hexane. A base such as sodium hydroxide, sodium carbonate or potassium carbonate is preferably included in the reaction mixture. As the reaction components are mixed they are beneficially stirred while being maintained at the above temperature.

The 2-(2-haloalkanoylamino)-3-phenylnorbornane that is formed is then aminated with an $NR''_2$ group, as identified above, to form a 2-(2-aminoalkanoylamino)-3-phenylnorbornane of the invention. Reaction conditions for this second step are not considered critical and may be varied somewhat. Advantageously this reaction is carried out with refluxing for extended periods of time, such as between about 8 and 24 hours, in a suitable solvent. Solvents which are suitable include, for example, ethanol, 2-propanol and 2-propanol-ether.

In preparing 2-(2-aminoalkanoylamino)-3-phenylnorbornane compounds of the invention in which R is a lower alkyl, 2-amino-3-phenylnorbornane is first reacted with a lower alkanamide to form 2-lower alkanoylamino-3-phenylnorbornane, the resulting 2-lower alkanoylamino-3-phenylnorbornane is reduced with a suitable reducing agent, such as $LiAlH_4$, to form 2-lower alkylamino-3-phenylnorbornane which is further reacted as previously described for the formation of 2-aminoalkanoylamino-3-phenylnorbornanes.

More specifically, compounds in which R is methyl are readily prepared using formamide as the lower alkanamide. This reaction is preferably carried out at the boiling temperature of formamide.

The preparation of the novel compounds of this invention will be graphically described in the following reaction sequences which respectively represent synthesis of compounds in which R is hydrogen or methyl.

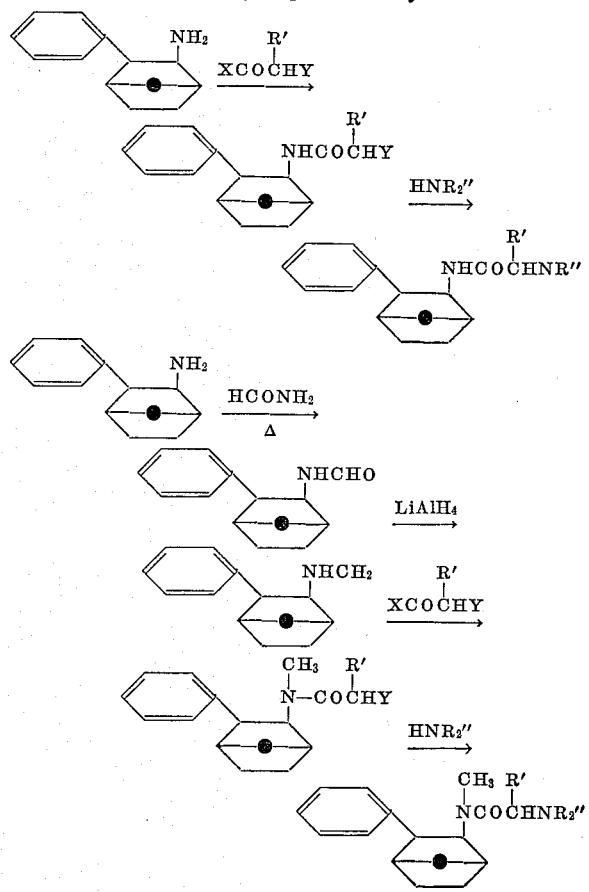

In these reaction sequences X and Y represent halogens and may be the same or different.

The invention will be further particularized in the following examples which set forth processes for preparing some of the novel compounds and novel intermediates of the invention. These examples are provided to aid in understanding this invention and are not to be considered as limiting the scope of the invention which is set forth in the appended claims.

EXAMPLE I 2-(2-diethylaminoacetylamino-3-phenylnorbornane oxalate

A benzene solution of chloroacetyl chloride (11.3 g., 0.1 mole) was slowly added to an ice-cold, stirred solution of 2-amino-3-phenylnorbornane (18.7 g., 0.1 mole) in 200 ml. of benzene and 60 ml. of 20% NaOH and the mixture was stirred in the cold for an additional hour. The benzene layer was collected and concentrated in vacuo to an oil. The concentrate and diethylamine (14.6 g., 0.2 mole) were dissolved in 250 ml. of toluene and the solution was heated under reflux with stirring for 18 hours. The mixture was filtered and the filtrate was washed with water, dried over $MgSO_4$ and concentrated in vacuo to an oil.

The concentrate was dissolved in ether and an ether and an ether solution of oxalic acid (10 g., 0.11 mole) was added to form a sticky oil that slowly solidified. The solid was collected and twice recrystallized from a 2-propanol-methanol-ether solution. M.P. 124°–125.5° C. (dec.), yield 18.1 g.

*Analysis.*—Calcd. for $C_{19}H_{28}N_2O \cdot C_2H_2O_4$ (percent): C, 64.6; H, 7.74; N, 7.17. Found (percent): C, 64.5; H, 7.80; N, 7.21.

EXAMPLE II

2-[2-(4-phenyl-1-piperidyl)acetylamino]-3-phenylnorbornane oxalate

A benzene solution of chloroacetyl chloride (11.3 g., 0.1 mole) was slowly added to an ice-cold, stirred solution of 2-amino-3-phenylnorbornane (18.7 g., 0.1 mole) in 200 ml. of benzene and 60 ml. of 20% NaOH and the mixture was stirred in the cold for an additional hour. The benzene layer was collected and concentrated in vacuo to an oil. The concentraet, 4-phenylpiperidine (16.1 g., 0.1 mole), sodium carbonate (12 g., 0.113 mole) and 300 ml. of 1-propanol were heated under reflux with stirring for 18 hours. The mixture was filtered and the filtrate was concentrated in vacuo to an oil.

The oil was dissolved in ether and an ether solution of oxalic acid (19 g., 0.11 mole) was added to form a viscous mass that hardened on cooling. The salt was crystallized from a 2-propanol-ether solution and recrystallized twice from a 2-propanol-methanol-ether solution and once from a 2-propanol-methanol solution. M.P. 183°–184° C. (dec.), yield, 8 g.

*Analysis.*—Calcd. for $C_{26}H_{32}N_2O \cdot C_2H_2O_4$ (percent): C, 70.3; H, 7.16; N, 5.85; N (basic), 2.93. Found (percent): C, 69.8; H, 7.63; N, 5.79; N (basic), 2.85.

EXAMPLE III

2-[2-(4-phenyl-1-piperidyl)propionylamino]-3-phenylnorbornane oxalate (A) 2 - (2 - chloropropionylamino - 3 - phenylnorborane.—A benzene solution of 2-chloropropionyl chloride (20.4 g., 0.16 mole) was added dropwise to an ice-cold, stirred solution of 2-amino-3-phenylnorbornane (30 g., 0.'16 mole) in 150 ml. of benzene and 75 ml. of 20% NaOH and the mixture was stirred in the cold for an additional hour. The solid was collected, washed with water and dried. This solid was triturated in petroleum hexane, collected and dried. Yield, 21 g., M.P. 137°–142° C.

*Analysis.*—Calcd. for $C_{16}H_{20}ClNO$ (percent): N, 5.04. Found (percent): N, 5.07.

(B) 2 - [2 - (4 - phenyl - 1 - piperidyl)propionylamino]-3-phenylnorbornane oxalate.—A mixture of 2-(2-chloropropionylamino - 3 - phenylnorbornane (21 g., 0.075 mole), 4-phenylpiperidine (12.2 g., 0.075 mole), sodium carbonate (8.5 g., 0.08 mole) and 200 ml. of 2-propanol was heated under reflux with stirring for 20 hours. The mixture was filtered and the filtrate was concentratd in vacuo to an oil. The oil and 9 g. of oxalic acid were dissolved in methanol, filtered and diluted with ether. The salt was collected and recrystalized from a methanol-ether solution. Yield, 17.5 g., softens ca. 112° C. and gradually melts with decomposition above 117° C.

*Analysis.*—Calcd. for $C_{27}H_{34}N_2O \cdot C_2H_2O_4$ (percent): C, 70.7; H, 7.37; N, 5.68. Found (percent): C, 70.2; H, 7.39; N, 5.68.

EXAMPLE IV

2-[-2-(4-phenyl-1-piperazinyl)acetylamino]-3-phenylnorbornane maleate (A) 2-[2-(4-phenyl-1-piperazinyl)acetylamino]-3-phenylnorbornane.—2-amino-3-phenylnorbornane (18.7 g., 0.1 mole) and chloroacetyl chloride (11.3 g., 0.1 mole) were reacted under Schotten-Baumann conditions and the collected free base and 1-phenylpiperazine (16.2 g., 0.1 mole), sodium carbonate (12 g., 0.11 mole) and 250 ml. of 2-propanol were heated under reflux with stirring for 18 hours. The mixture was filtered and the filtrate was diluted with water and cooled. The crystalline solid was collected and recrystallized from methanol. Yield 20 g., M.P. 150°–151° C.

*Analysis.*—Calcd. for $C_{25}H_{31}N_3O$ (percent): N, 10.78. Found (percent): N, 10.80.

(B) 2 - [2 - (4 - phenyl - 1 - piperazinyl)acetylamino]-3-phenylnorbornane maleate.—2 - [2-(4-phenyl-1-piperazinyl)acetylamino]-3 - pehnylnorbornane (19.5 g., 0.05 mole) and 6.4 g. of maleic acid were dissolved in methanol, filtered, diluted with ether and cooled. The crystalline salt was collected and recrystallized from anhydrous ethanol. Yield, 20.6 g., M.P. 166°–168° C. (dec).

*Analysis.* Calcd. $C_{25}H_{31}N_3O \cdot C_4H_4O_4$ (percent): C, 68.9; H, 6.98; N, 8.31. Found (percent): C, 68.7; H, 7.13; N, 8.33.

EXAMPLE V

2-[2-phenyl-2-(4-phenyl-1-piperidyl)acetylamino]-3-phenylnorborane oxalate (A) 2 - (α - chlorophenylacetylamino) - 3 - phenylnorbornane.—2 - amino - 3 - phenylnorbornane (30 g., 0.16 mole), α-chlorophenylacetyl chloride (30.3 g., 0.16 mole) and 75 ml. of 20% NaOH were reacted in benzene under Schotten-Baumann conditions to yield a solid. The solid was recrystallized from an aqueous-ethanol solution. Yield, 21 g.

*Analysis.*—Calcd. for $C_{21}H_{22}ClNo$ (percent): N, 4.12. Found (percent): N, 4.14.

(B) 2 - [2 - phenyl - 2-(4-phenyl-1-piperidyl)acetylamino]-3-phenylnorbornane oxalate.—A mixture of 2-(α-chlorophenylacetylamino) - 3-phenylnorbornane (20.3 g., 0.061 mole), 4-phenylpiperidine (9.8 g., 0.061 mole), sodium carbonate (6.8 g., 0.065 mole) and 250 ml. of 2-propanol was heated under reflux with stirring for 24 hours. The mixture was filtered and the filtrate was concentrated in vacuo to an oil. An ether solution of oxalic acid (8 g.) was added to an ether solution of the concentrate to form a sticky oil. The ether was decanted and the oil was triturated in fresh ether to slowly solidify the oil. The salt was collected and recrystallized from n-amyl alcohol-ether. Yield, 4 g., M.P. 202°–204° C. (dec.).

*Analysis.*—Calcd. for $C_{32}H_{36}N_2O \cdot C_2H_2O_4$ (percent): C, 73.6; H, 6.91; N, 5.05. Found (percent): C, 73.1; H, 6.90; N, 5.01.

EXAMPLE VI

2-(N-methyl-2-morpholinoacetylamino)-3-phenylnorbornane oxalate 3-phenyl-2-methylaminonorbornane (10 g., 0.05 mole), chloroacetyl chloride (5.7 g., 0.05 mole), 25 ml. of 20% NaOH in benzene were reacted under Schotten-Baumann conditions to yield an oil on concentration of the benzene; $\nu_{max}1650$ cm.$^{-1}$ (amide C=O). The concentrate (amide) and morpholine (8.7 g., 0.1 mole) in 150 ml. of toluene were heated under reflux with stirring for 18 hours. The mixture was filtered and the filtrate was washed with water and concentrated in vacuo. The concentrate and 5 g. of oxalic acid were dissolved in hot 2-propanol and cooled to form a crystalline salt. The salt was recrystallized from a 2-propanol-ethanol solution. Yield, 13.8 g., M.P. 154°–157° C. (dec.).

*Analysis.*—Calcd. for $C_{20}H_{28}N_2O_2 \cdot C_2H_2O_4$ (percent): C, 63.2; H, 7.22; N, 6.69. Found (percent): C, 63.0; H, 7.26; N, 6.64.

EXAMPLE VII

2-(2-dimethylaminoacetylamino)-3-phenylnorbornane hydrochloride 2-chloroacetylamino-3-phenylnorbornane (0.15 mole), dimethylamine (40 g., 0.89 mole) and anhydrous $Na_2CO_3$ (21.0 g., 0.2 mole) in 500 ml. of absolute ethanol were heated under reflux for 20 hours with stirring. The cooled mixture was filtered and concentrated in vacuo to leave a viscous oil which was taken up in acetone and treated with 0.15 mole of 5 N 2-propanolic HCl. The resulting salt melted at 192.5°–196.5° C., yield 17.0 g.

*Analysis.*—Calcd. for $C_{17}H_{25}ClN_2O$ (percent): N (basic), 4.53; HCl, 11.8. Found (percent): N (basic), 4.48; HCl, 11.9.

EXAMPLE VIII

2-(N-methyl-2-diethylaminoacetylamino)-3-phenylnorbornane

2 - (N - methyl - 2-chloroacetylamino)-3-phenylnorbornane (0.19 mole), diethylamine (30.0 g., 0.41 mole) and $Na_2CO_3$ (21.0 g., 0.2 mole) in 100 ml. of absolute ethanol were refluxed overnight with stirring. The mixture was filtered and concentrated in vacuo to give an oily residue which was treated wits oxalic acid (0.2 mole) to give a solid of M.P. 79°–84° C., yield 60.0 g.

*Analysis.*—Calcd. for $C_{22}H_{32}N_2O_5$ (percent): N (basic), 3.46; neut. equiv. 202. Found (percent): N (basic), 3.35; neut. equiv. 204.

What is claimed is:

1. A compound selected from the group consisting of compounds of the formula:

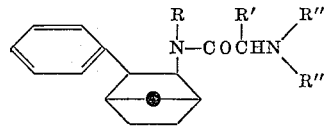

in which R is a member selected from the group consisting of hydrogen and methyl; R' is a member selected from the group consisting of hydrogen, methyl, and phenyl; NR''$_2$ is a member selected from the group consisting of dimethylamino, diethylamino, morpholino, 4-phenyl-1-piperazinyl and 4-phenyl-1-piperidyl; and pharmocologically acceptable salts thereof.

2. A compound of claim 1 which is 2-(2-diethylaminoacetylamino)-3-phenylnorbornane.

3. A compound of claim 1 which is 2-[2-(4-phenyl-1-piperidyl)acetylamino]-3-phenylnorbornane.

4. A compound of claim 1 which is 2-[2-(4-phenyl-1-piperidyl)-propionylamino]-3-phenylnorbornane.

5. A compound of claim 1 which is 2-[2-(4-phenyl-1-piperazinyl)acetylamino]-3-phenylnorbornane.

6. A compound of claim 1 which is 2-]2-phenyl-2-(4-phenyl-1-piperidyl)acetylamino]-3-phenylnorbornane.

7. A compound of claim 1 which is 2-(N-methyl-2-morpholinoacetylamino)-3-phenylnorbornane.

8. A compound of claim 1 which is 2-(2-dimethylaminoacetylamino)-3-phenylnorbornane.

9. A compound of claim 1 which is 2-(N-methyl-2-diethylaminoacetylamino)-3-phenylnorbornane.

References Cited

UNITED STATES PATENTS 3,223,700   12/1965   Klavehn et al. _____ 260—239.1

ALEX MAZEL, Primary Examiner

J. TOVAR, Assistant Examiner

U.S. Cl. X.R.

260—268, 294, 561; 424—248, 250, 267